United States Patent [19]
Freadman

[11] Patent Number: 5,805,708
[45] Date of Patent: Sep. 8, 1998

[54] SPEAKER SYSTEM FOR COMPUTER

[76] Inventor: Tommyca Freadman, 16 Glen Dr., Goshen, N.Y. 10924

[21] Appl. No.: 735,088

[22] Filed: Oct. 22, 1996

Related U.S. Application Data

[60] Provisional application No. 60/021,526, Jul. 11, 1996.

[51] Int. Cl.⁶ .................................................. H04R 25/00
[52] U.S. Cl. ........................... 381/159; 381/24; 381/188; 181/182
[58] Field of Search ..................... 381/159, 188, 381/154, 156, 157; 181/179, 182, 184, 160, 199, 200

[56] References Cited

U.S. PATENT DOCUMENTS

| | | | |
|---|---|---|---|
| 4,836,329 | 6/1989 | Klayman | 181/155 |
| 5,025,885 | 6/1991 | Froeschle | 181/156 |
| 5,440,645 | 8/1995 | Freadman | 381/188 |
| 5,481,616 | 1/1996 | Freadman | 381/90 |
| 5,550,921 | 8/1996 | Freadman | 381/24 |
| 5,610,992 | 3/1997 | Hickman | 381/188 |
| 5,633,943 | 5/1997 | Daniels et al. | 381/188 |
| 5,646,820 | 7/1997 | Honda et al. | 381/188 |

*Primary Examiner*—Curtis Kuntz
*Assistant Examiner*—Rexford N. Barnie
*Attorney, Agent, or Firm*—Graham & James LLP

[57] ABSTRACT

A speaker system for a computer includes at least one speaker disposed within a computer case, at least two sound emitting ports disposed on an exterior of the computer case, at least two sound transmitting paths each disposed within the computer case and connected to the at least one speaker and a respective one of the at least two sound transmitting paths for receiving sound waves from the at least one speaker and transmitting the sound waves to a respective one of the at least two sound emitting ports.

20 Claims, 2 Drawing Sheets

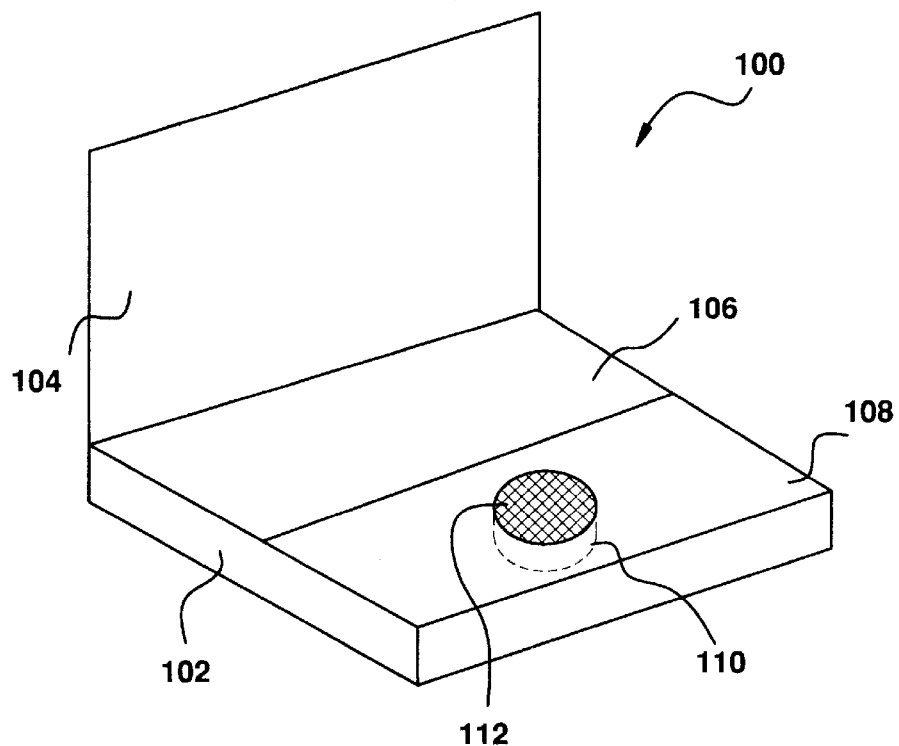
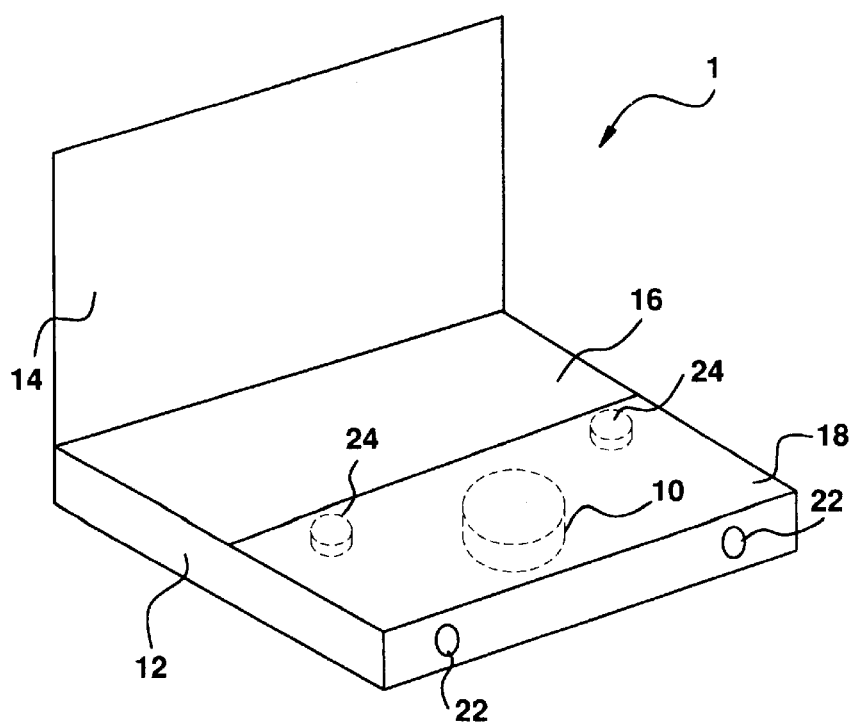

SPEAKER SYSTEM FOR COMPUTER

This application claims priority from provisional application Ser. No. 60/021,526 filed Jul. 11, 1996.

BACKGROUND OF THE INVENTION

This invention relates to a speaker system preferably for use in a laptop or notebook computer, and more specifically, to an improved arrangement of at least one speaker provided within a computer housing such that the sound produced by the at least one speaker and emitted from the computer housing is greatly improved.

DESCRIPTION OF RELATED ART

As computers are used more frequently for multimedia applications, there has been an increased demand for high-quality speakers for use with computers. One type of computer speakers are completely independent of the computer and are connected to audio output ports provided on the computer.

While this type of arrangement may be acceptable for desktop computers, this arrangement proved to be too cumbersome for laptop or notebook computers. Because of the substantially reduced size of laptop and notebook computers and the desire to have the most lightweight and simple configuration for a laptop or notebook computer, the use of relatively large independent speakers which must be manually connected to an input port in the laptop or notebook computer is undesirable.

To overcome this problem, laptop or notebook computers were redesigned to incorporate a speaker or speakers within the housing of the computer.

FIG. 1 shows such a conventional laptop computer 100 including a case 102, a display 104, a keyboard 106 and a palm rest 108. The computer 100 also has a speaker 110 located within the palm rest 108 provided adjacent the keyboard 106. The speaker 110 is connected to a sound card or other suitable sound generating device disposed within the computer 100. An upper surface of the speaker is covered by a suitable cover or grill 112 connected to the palm rest 108. The speaker is arranged so as to "fire" or emit sound from the palm rest 108 in a direction towards an upper surface of the palm rest 108 such that sound is transmitted from an upper surface of the palm rest 108 through the speaker cover 112.

This type of design has several disadvantages. When a user is operating the computer 100, the user's hands are located on the palm rest 108 and will muffle the sound produced by the speaker 110.

In addition, because of the arrangement of the speaker 110 within the computer case 102, the sound quality of the sound produced by the speaker 110 is very poor. As discussed above, the sound produced by the speaker 110 is fired from an upper surface of the speaker 110 through a single port located at an upper surface of the palm rest 108. However, back waves or sound that is emitted from a bottom surface of the speaker 110 is not ported and therefore, is transmitted from the bottom surface of the speaker 110 to the interior of the case 102 located at the palm rest 108. The result is that the sound waves emitted from a bottom surface of the speaker 110 interfere and cancel sound waves emitted from an upper surface of the speaker 110 to produce a low volume, low quality sound.

BRIEF DESCRIPTION OF THE PRESENT INVENTION

The preferred embodiments of the present invention overcome the disadvantages described above by providing a speaker system including at least one speaker disposed within a computer such that the speaker produces high-volume and high-quality sound generated by applications run by the computer. More specifically, the preferred embodiments of the present invention provide a novel arrangement of at least one speaker that is hidden within a computer case and includes multiple sound ports such that the speaker is capable of producing high-quality sound without increasing the size of the computer.

According to a first preferred embodiment of the present invention, a speaker system for a computer includes at least one speaker disposed within a computer case, at least two sound emitting ports disposed on an exterior of the computer case, at least two sound transmitting paths each disposed within the computer case and connected to the at least one speaker and a respective one of the at least two sound transmitting paths for receiving sound waves from the at least one speaker and transmitting the sound waves to a respective one of the at least two sound emitting ports.

According to another preferred embodiment of the present invention, a speaker system for a computer includes at least one speaker disposed within a computer case, the at least one speaker being mounted within the case via at least one support member such to that the speaker is located at a desired distance from an upper surface of the computer case and a lower surface of the computer case, an upper surface of the speaker having a rim member extending around a portion of the circumference of the speaker, first and second sound transmitting paths located within the computer case, the rim member being connected to the first sound transmitting path which extends along the computer case to a first sound emitting port for emitting sound generated by the at least one speaker, the bottom surface of the speaker being sealed by the second sound transmitting path for transmitting sound waves emanating from the bottom portion of the speaker via the second sound transmitting path to a second sound emitting port for emitting sound generated by the speaker.

In a further embodiment, the sound system can include at least two speakers each disposed within the computer case and each speaker including first and second sound transmitting paths which are connected to a common mixing chamber for mixing the sound and filtering out undesired sound frequencies to produce a higher-quality sound. The mixing chamber is preferably connected to at least two sound emitting ports for firing the sound generated by the at least two speakers.

In the preferred embodiments described above, the sound emitting ports are preferably located at a front edge of the computer case and a rear edge of the computer case. The sound emitting ports located at the rear edge of the computer case are preferably located at a rear edge of the palm rest adjacent the keyboard of the computer. In an alternative embodiment, the sound emitting ports can be located on the left and right side surfaces of the computer.

In the preferred embodiment described above, all of the sound generated by the speaker is either transmitted to the first sound transmitting path or the second sound transmitting path. Consequently, the sound waves emitted from the upper surface of the speaker and the sound waves emitted from the lower surface of the speaker do not interfere with each other or cancel each other.

Instead, the sound produced by the speaker system described above is greatly improved compared to the prior art arrangement. This improved sound results from an enhanced base response and the summing of sound waves instead of the cancellation or baffling of sound waves which occurs in the prior art. The prior art speaker only allows sound to be ported or emitted from a single exit port located on an outer portion of the computer case. As a result of this arrangement, sound waves emanating from the bottom surface of the speaker reverberate within the speaker housing and cancel with sound waves generated from the front surface of the speaker to produce a baffled sound.

By providing multiple sound emitting ports and by locating the speaker in a specific desired position relative to an upper and lower surface of the computer case in the preferred embodiments of the present invention, it is possible to back-fire and front-fire the sound to prevent cancellation of sound waves. More specifically, the inner casing of the speaker is used to direct back waves of the speakers to avoid cancellation. As described above, a portion of the sound produced by the speaker is transmitted via a first sound transmission path to a first sound emitting port and a second portion of the sound is transmitted to a second sound transmission path to a second sound emitting port. The cancellation of the sound waves is avoided because the difference in lengths and volume of the sound transmission paths for the first and second portions of the sound produce a phase shift between the first and second portions of the sound. The result of dividing of the front waves and back waves of the speakers and separately firing these portions of the sound produced by the speaker via two separate sound transmission paths is that a summing effect is produced to thereby increase the base response, sound quality and fullness of sound produced by the speaker. This arrangement avoids the muffling, baffling and sound cancellation of the prior art arrangements.

In addition, the arrangement of the speaker system according to the preferred embodiments of the present invention avoids the problems associated with only front firing the speakers as in the prior art. In the preferred embodiments of the present invention, the sound is fired or emitted from sound emitting ports provided on the edges of the computer case located remote from an operator's hand position.

If desired, the sound can also be fired from a port located at an opening in the computer case provided for a mouse or track ball located within the palm rest. The number and location of the sound emitting ports can be varied according to necessity or specific desires.

Thus, the hidden speaker arrangement including one or more speakers produces relatively huge sound as compared to the single or two-speaker front firing system of the prior art. In addition, the arrangement of the at least one speaker according to the preferred embodiments of the present invention allows the speaker to be hidden and occupy minimal existing space thereby avoiding the need to increase the size of the laptop or notebook.

Other features and advantages of the present invention will become apparent from the following description of the preferred embodiments of the present invention which are shown in the accompanying drawings.

BRIEF DESCRIPTION OF THE DRAWINGS

FIG. 1 is a schematic view of a conventional speaker system for a computer;

FIG. 2 is a side view of a preferred embodiment of the speaker system of the present invention;

BRIEF DESCRIPTION OF THE PREFERRED EMBODIMENTS

Figure 3:
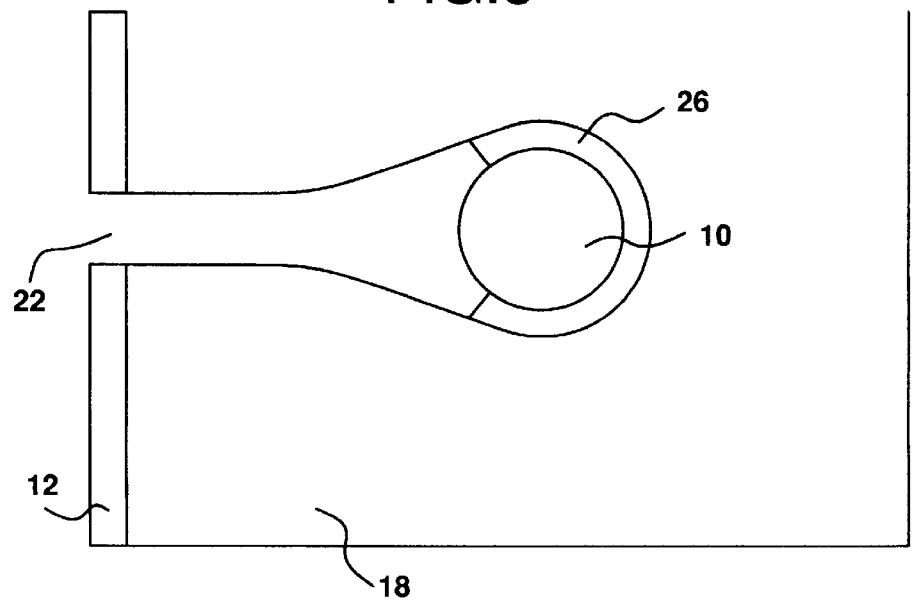
FIG. 3 is a top view of a preferred embodiment of the speaker system of the present invention.

A first preferred embodiment of the present invention is shown in FIG. 2. A computer 1, preferably a laptop or notebook computer, includes a case 12, a display 14, a keyboard 16, a palm rest 18 and a speaker 20. The speaker 20 is connected to a sound card or other suitable sound generating device provided in the computer 1. The structure and operation of the speaker 20 is known and will therefore not be described herein.

A plurality of sound emitting ports 22, 24 are preferably disposed on a front edge of the case 12 and a rear edge of the palm rest 18 adjacent to the keyboard 16, respectively. Alternatively, the sound emitting ports may be located on the left and right side edges of the case 12. It is also possible that sound emitting ports may be located at each of the front, left and right side edges of the case and the rear edge of the palm rest adjacent to the keyboard 16.

Because of the location of the sound emitting ports 22, 24, the placement of an operator's hands on the palm rest 18 does not muffle the sound emitted from the ports 22, 24. Because the sound is fired from the ports 22, 24 which are spaced from a location of the speaker 20, the speaker 20 can be disposed within the case 12 at the palm rest 18 so that the speaker 20 is completely hidden from view.

Figure 4:
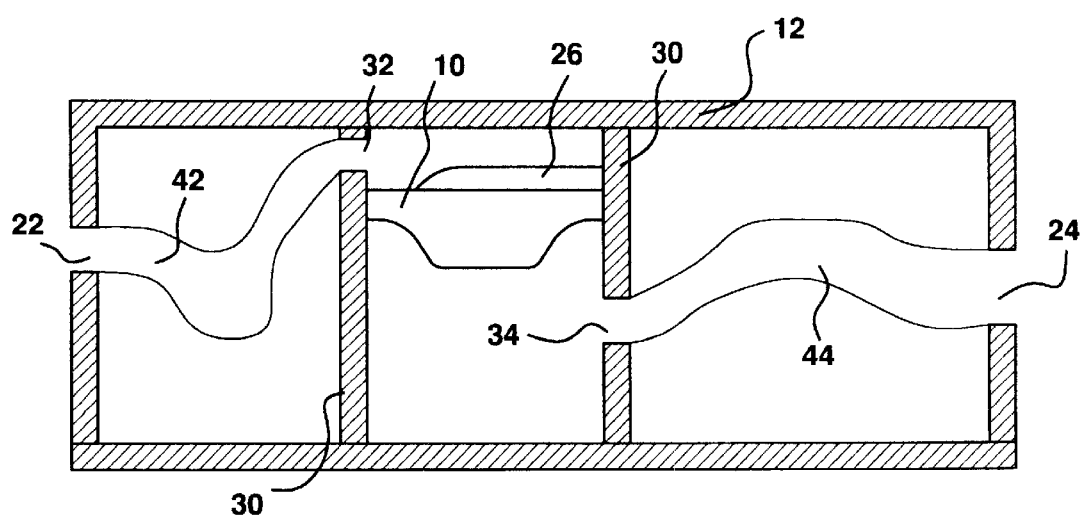
FIG. 4 is a side sectional view of the preferred embodiment shown in FIG. 2.

The arrangement of the speaker 20 is more clearly illustrated in FIGS. 3 and 4. As seen in FIG. 4, the speaker 20 is mounted within the case 12 via a support 30. The support 30 may preferably comprise a rigid material such as plastic that is formed either in a substantially circular shape or comprises two separate mounting portions which surround the speaker 20. The support 30 is formed so as to seal the speaker 20 and to locate the speaker 20 at a desired distance from an upper surface of the case and a lower surface of the case.

The support includes at least two openings 32, 34 for directing sound waves generated by the speaker 20 to a first sound transmitting path 42 and a second sound transmitting path 44. As seen in FIG. 4, the first sound transmitting path 42 is connected to the sound emitting port 22 and the second sound transmitting path 44 is connected to the sound emitting port 24. Although not visible in FIGS. 3 and 4, a plurality of sound emitting ports 22 spaced along the front edge of the case 12 and a plurality of sound emitting ports 24 spaced along the rear edge of the palm rest 18 may be provided.

A sound directing rim 26 is preferably provided at an upper surface of the speaker 20 to direct sound waves emanating from an upper surface of the speaker 20 into the first sound transmitting path 42.

As a result of the speaker 20 being located within the support 30, the speaker 20 is completely sealed within the case 12. The sound emanating from an upper portion of the speaker 20 is directed by the sound directing rim 26 through the opening 32 to the first sound transmitting path 42. The sound emanating from a bottom portion of the speaker 20 is directed through the opening 34 to the second sound transmitting path 44.

While the sound is being transmitted via the first and second sound transmitting paths 42, 44 to the sound emitting ports 22, 24, the sound in the two paths 42, 44 is filtered such that the sound emitted from the ports 22, 24 is in phase to avoid cancellation and to provide a summing effect. That is, because of the differences in length and volume of the sound transmitting paths 42, 44, the sound emitted from the first sound transmitting path 42 is delayed and phase shifted, by preferably 180 degrees, relative to the sound emitted from the second sound transmitting path 44. As a result, the sound produced by the speaker 20 at the ports 22, 24 is high-volume and high quality. In addition, the bass response of the sound produced is greatly enhanced.

If desired, filtering components such as amplifiers, band pass filters, low pass filters, high pass filters, equalizers and other suitable components may be provided within the sound transmitting paths 42, 44 to provide further refinement and fine-tuning of the sound produced. For example, a sound amplifying plate may be provided within the sound transmitting paths 42, 44 to amplify the sound produced at the sound emitting ports 22, 24.

Thus, the arrangement of the speaker 20 in the support 30, the multiple sound transmitting paths 42, 44 and the sound emitting ports 22, 24 allow the speaker 20 to be front-fired and back-fired such that the interior of the computer case 12 is used to direct the back sound waves and front sound waves generated by the speaker 20 to provide a summing affect of the back and front sound waves, thereby avoiding a cancellation effect existing in prior art arrangements.

In a modification of the preferred embodiment described above, the sound system can include at least two speakers 20 each disposed within the computer case 12. Each speaker 20 preferably includes the first and second sound transmitting paths 42, 44 as described above. However, these sound transmitting paths 42, 44 are preferably connected to a common mixing chamber for mixing the sound and filtering out undesired sound frequencies to produce a higher-quality sound. The mixing chamber is preferably connected to at least two sound emitting ports for firing the sound generated by the at least two speakers.

Although the present invention has been described in relation to particular preferred embodiments thereof, many variations and modifications and other uses will become apparent to those skilled in the art. It is preferred, therefore, that the present invention be limited not by the specific disclosure herein, but only by the appended claims.

What is claimed is:

1. A speaker system for a computer including a computer case having a top wall, a bottom wall and side walls connecting the top wall and the bottom wall, the speaker system comprising:

at least one speaker disposed within the computer case;
    a support located within the computer case for supporting the at least one speaker such that the speaker is spaced from the top and bottom walls of the computer case, the support including a first opening located above a front surface of the at least one speaker so as to receive front waves from the front surface and a second opening located below a back surface of the at least one speaker so as to receive back waves from the back surface;
    at least two sound emitting ports disposed on an exterior surface of the computer case; and
    at least two sound transmitting paths each disposed within the computer case and connected to the at least one speaker via one of the first and second openings of the support and connected to a respective one of the at least two sound emitting ports for receiving sound waves generated by the at least one speaker via the first and second holes in the support and transmitting the sound waves to a respective one of the at least two sound emitting ports via the at least two sound transmitting paths.

2. The speaker system according to claim 1, wherein the at least one speaker is spaced from the top wall of the computer case to define a front sound wave chamber disposed in contact with the first opening in the support, the front sound wave chamber arranged to receive sound waves from the front surface of the at least one speaker and transmit front sound waves via the first opening in the support and one of the at least two sound transmitting paths to one of the at least two sound emitting ports.

3. The speaker system according to claim 1, wherein the at least one speaker is spaced from the bottom wall of the computer case to define a back sound wave chamber disposed in contact with the second opening in the support, the back sound wave chamber arranged to receive sound waves from the back surface of the at least one speaker and transmit back sound waves via the second opening in the support and one of the at least two sound transmitting paths to one of the at least two sound emitting ports.

4. The speaker system according to claim 1, further comprising a sound directing rim provided at an upper surface of the at least one speaker and arranged to direct sound waves emanating from the upper surface of the speaker to one of the least two sound transmitting paths.

5. The speaker system according to claim 1, wherein said at least two sound emitting ports are respectively disposed at a front edge of the computer case and rear edge of a palm rest formed on the computer case.

6. The speaker system according to claim 1, wherein said at least two sound emitting ports are respectively disposed at opposite side edges of the computer case.

7. The speaker system according to claim 1, wherein one of the at least two sound emitting ports is located at an opening formed in the computer case for housing a mouse therein.

8. The speaker system according to claim 1, further comprising a plurality of speakers disposed within the computer case, each of the plurality of speakers being connected to a first sound transmitting path and a second sound transmitting path.

9. The speaker system according to claim 8, further comprising a mixing chamber for mixing sound produced by the plurality of speakers, wherein the first and second sound transmitting paths of the plurality of speakers are connected to the mixing chamber.

10. The speaker system according to claim 9, wherein the mixing chamber is connected to the at least two sound emitting ports for transmitting sound waves from the first and second transmitting paths to the at least two sound emitting ports.

11. A computer comprising:

a computer case having a top wall, a bottom wall and side walls connecting the top wall and the bottom wall;
    a keyboard disposed on a operator surface of the computer case;
    a palm rest disposed on the operator surface of the computer case adjacent the keyboard;
    at least one speaker disposed within the computer case;
    a support located within the computer case for supporting the at least one speaker such that the speaker is spaced from the top and bottom walls of the computer case, the support including a first opening located above a front surface of the at least one speaker so as to receive front waves from the front surface and a second opening located below a back surface of the at least one speaker so as to receive back waves from the back surface;
    at least two sound emitting ports disposed on an exterior surface of the computer case; and
    at least two sound transmitting paths each disposed within the computer case and connected to the at least one speaker via one of the first and second openings of the support and connected to a respective one of the at least two sound emitting ports for receiving sound waves generated by the at least one speaker via a respective one of the first and second holes in the support and transmitting the sound waves to a respective one of the at least two sound emitting ports via a respective one of the at least two sound transmitting paths.

12. The computer according to claim 11, wherein the at least one speaker is disposed within the computer case at a location below the palm rest.

13. The computer according to claim 11, wherein at least two sound transmitting paths are acoustically isolated from an interior of the computer case defined by the top, bottom and side walls thereof.

14. The computer according to claim 11, further comprising a sound directing rim disposed at an upper surface of the at least one speaker, the sound directing rim extending around a portion of a circumference of the at least one speaker to direct sound from the at least one speaker to one of the at least two sound transmitting paths.

15. The computer according to claim 11, wherein the at least one speaker is sealed within the computer case such that a bottom portion of the at least one speaker opens only at a location of a first one of the at least two sound transmitting paths and a top portion of the at least one speaker opens only at a second one of the at least two sound transmitting paths.

16. A sound system for a computer having a computer case including a top wall, a bottom wall and side walls connecting the top and bottom walls, the sound system comprising:

at least one speaker disposed within the computer case;

at least two sound transmitting paths arranged to receive front and back sound waves from front and back surfaces of the at least one speaker, the at least two sound transmitting paths being separate from and acoustically isolated from an interior of the computer case defined by the top, bottom and side walls thereof;

a plurality of sound emitting ports connected to the at least one speaker via the at least two sound transmitting paths; wherein the at least one speaker, the at least two sound transmitting paths and the plurality of sound emitting ports are arranged such that back waves emanating from the rear surface of the at least one speaker are directed to one of the plurality of sound emitting ports via a first one of the at least two sound transmitting paths and front waves emanating from the front surface of the at least one speaker are directed to another of the plurality of sound emitting ports via a second one of the at least two sound transmitting paths.

17. The sound system according to claim 16, wherein the at least one speaker is spaced from the top wall of the computer case to define a front sound wave chamber disposed in contact with the first opening in the support, the front sound wave chamber arranged to receive sound waves from the front surface of the at least one speaker and transmit front sound waves via the first opening in the support and one of the at least two sound transmitting paths to one of the at least two sound emitting ports and the at least one speaker is spaced from the bottom wall of the computer case to define a back sound wave chamber disposed in contact with the second opening in the support, the back sound wave chamber arranged to receive sound waves from the back surface of the at least one speaker and transmit back sound waves via the second opening in the support and one of the at least two sound transmitting paths to one of the at least two sound emitting ports.

18. The speaker system according to claim 16, wherein the at least two sound transmitting paths have different shapes so as to produce a phase shift between the back waves and the front waves such that the back waves and front waves are summed.

19. The speaker system according to claim 16, further comprising a support member for supporting and sealing the at least one speaker within the computer case, the support member completely sealing the at least one speaker except for a first opening connected to a first one of the at least two sound transmitting paths and a second opening connected to a second one of the at least two sound transmitting paths.

20. The speaker system according to claim 16, further comprising a mixing chamber and a plurality speakers being arranged such that back waves emanating from a rear of each of the plurality of speakers are directed to the mixing chamber and then to one of the plurality of sound emitting ports and front waves emanating from a top portion of each of the plurality of speakers are directed to the mixing chamber and then to another of the plurality of sound emitting ports.

* * * * *